H. GIBBS.
GREASE CUP.
APPLICATION FILED MAY 14, 1915.

1,213,861.

Patented Jan. 30, 1917.

UNITED STATES PATENT OFFICE.

HENRY GIBBS, OF CHICAGO, ILLINOIS, ASSIGNOR TO W. D. ALLEN MANUFACTURING COMPANY, OF CHICAGO, ILLINOIS, A CORPORATION.

GREASE-CUP.

1,213,861.  Specification of Letters Patent.  Patented Jan. 30, 1917.

Application filed May 14, 1915. Serial No. 28,114.

*To all whom it may concern:*

Be it known that I, HENRY GIBBS, a citizen of the United States, and a resident of Chicago, county of Cook, and State of Illinois, have invented certain new and useful Improvements in Grease-Cups, of which the following is a full, clear, and exact description.

The invention relates to grease cups and seeks to provide simple and effective means for preventing the accidental rotation of the screw threaded cap of the grease cup.

The invention consists in the features of improvement hereinafter set forth, illustrated in the preferred form in the accompanying drawings and more particularly pointed out in the appended claims.

Figure 1:
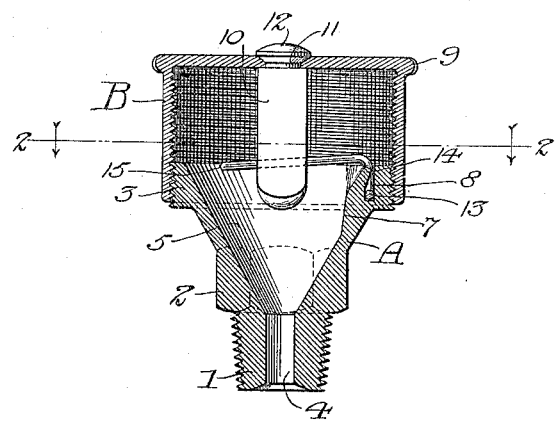
Figure 2:
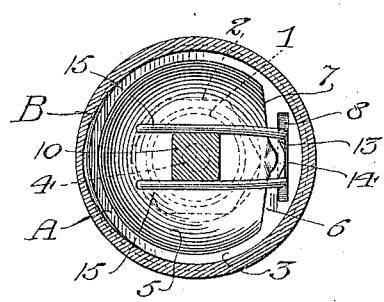

In the drawings, Figure 1 is a vertical section of the improved grease cup. Fig. 2 is a horizontal section on the line 2—2 of Fig. 1.

The grease cup comprises a base A and a cap B. The base A is provided at its lower end with a threaded shank 1 by which the grease cup can be secured in position on a bearing. Above the shank, the base is provided with a hexagonal wrench receiving portion 2. From the hexagonal portion, the walls of the base flare upwardly and outwardly and are provided at the upper portion of the base with an externally screw threaded flange 3. The shank 1 is provided with an orifice 4 through which the grease is forced into the bearing to be lubricated. Above the shank, the base is provided with a flaring or conical chamber 5.

The base is preferably formed of malleable cast metal. On one side the wall of the flange portion 3 is thickened to form a segmental part 6. The inner face 7 of this part 6 extends transversely across the chamber within the base on one side of the center axis thereof and this segmental part is provided with a slot or pocket 8 which is substantially parallel to the inner wall or face 7 thereof and which is open at its upper end.

The cap B is cup-shaped and is preferably formed of sheet metal. It is internally screw threaded to engage the screw threads of the base flange 3 and is provided at its upper end with a flange 9 by which it can be rotated to force the grease out of the cup. A rectangular and preferably square pin 10 is fixed at its upper end to the center of the top of the cup and depends therefrom. Preferably, as shown, the pin is provided with a reduced upper end portion 11 which extends through an opening in the cap and is headed over or upset as shown at 12 in Fig. 1 to rigidly secure the pin to the cap.

The base is provided with a spring which coöperates with the pin 10 to hold the cap against accidental rotation. This spring is formed with a single short piece of spring wire bent between its ends into a hairpin or U-shape. The bent end portion 13 of the U-shaped spring is bent or turned downwardly and extends into a slot or pocket 8. After the downturned bent end of the U-shaped spring is placed in the pocket 8, the metal wall between the pocket and the inner face of the segment 6 which is comparatively thin, is offset or crimped outwardly between the members of the U-shaped spring as indicated at 14 in the drawings to thereby rigidly secure the bent end of the U-shaped spring to the base.

The arms 15 of the U-shaped spring coöperate with the flat faces of the pin 10 to prevent the accidental rotation of the cap but these arms will yield to permit the rotation of the cap by hand.

It is obvious that changes may be made in the details set forth without departure from the essentials of the invention as defined in the claims.

I claim as my invention:—

1. A grease cup, comprising a base having a threaded upper portion, a cap threaded to engage the upper portion of said cup, a U-shaped spring having its outer end embedded in the upper portion of said base at one side thereof and having arms projecting laterally across the upper portion of said base and an angular pin fixed to and depending from said cap and extending between the members of said U-shaped spring.

2. A grease cup, comprising a base having a threaded upper end, and a pocket formed in said upper end, a threaded cap engaging the upper end of said base and having a depending angular pin therein and a spring extending laterally across the upper portion of said base and engaging said pin, said spring having its outer end rigidly secured within the pocket in the upper part of said base.

3. A grease cup comprising a base having a threaded flange at its upper end provided with a vertical slot at one side, a cap threaded on said flange and having a depending rectangular pin therein, and a U-shaped spring having arms extending laterally across the upper portion of said base on opposite sides of said pin, said U-shaped spring having a downturned bent end portion extending within said slot, and the wall of said slot being upset between the arms of said spring to secure the bent end portion thereof to said base, substantially as described.

4. A grease cup comprising a base having a threaded flange at its upper end provided with a vertical pocket open at its upper end, a cap threaded on said flange and having a depending angular pin therein, a spring extending laterally across the upper portion of said base and engaging said pin, said spring having a downturned outer end rigidly secured within said pocket, substantially as described.

HENRY GIBBS.

Copies of this patent may be obtained for five cents each, by addressing the "Commissioner of Patents, Washington, D. C."